June 4, 1968 J. A. RADWAN 3,387,147
MUSCLE STIMULATING PULSE GENERATOR
Filed June 9, 1967
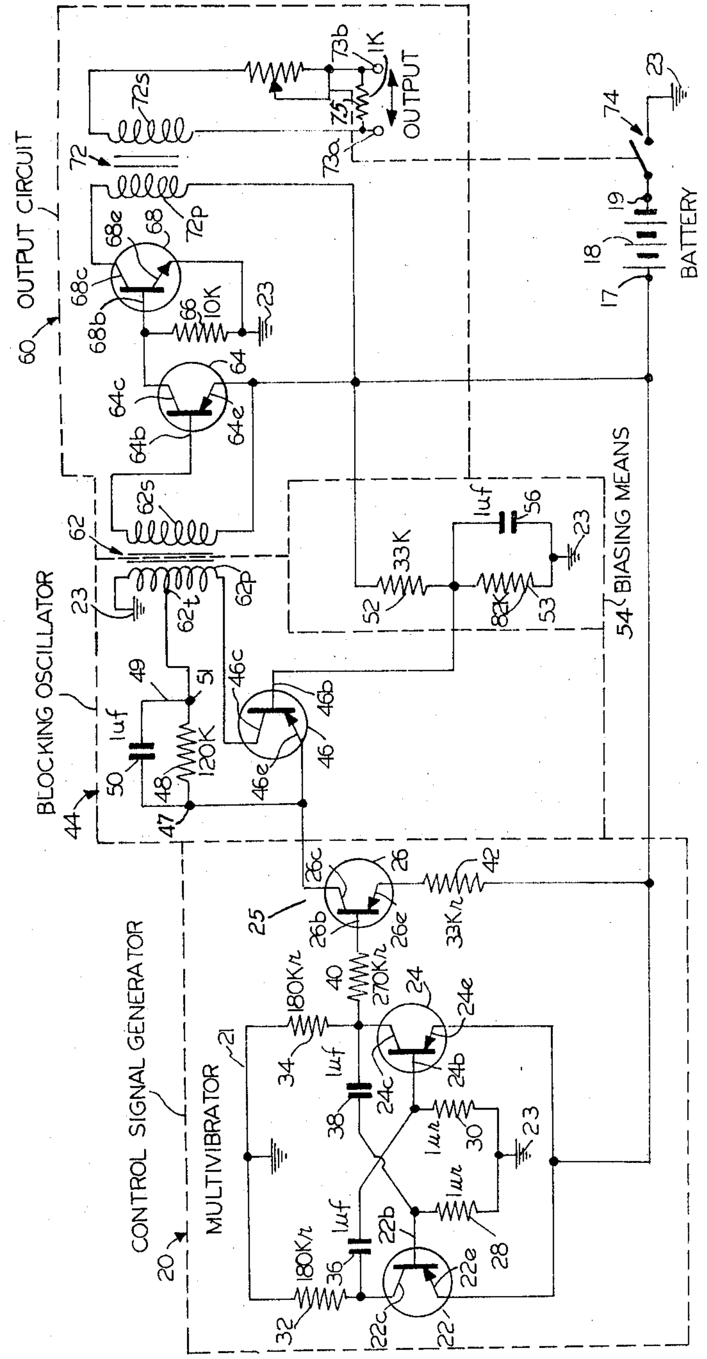
INVENTOR
JOSEPH A. RADWAN
BY *Watson, Cole, Grindle & Watson*
ATTORNEYS

United States Patent Office 3,387,147
Patented June 4, 1968

3,387,147

MUSCLE STIMULATING PULSE GENERATOR

Joseph A. Radwan, Wichita, Kans., assignor to Dynatone Electronics Corporation, New York, N.Y., a corporation of New York Filed June 9, 1967, Ser. No. 644,863
10 Claims. (Cl. 307—275)

ABSTRACT OF THE DISCLOSURE

This invention relates to improvements in pulse generating circuitry for providing muscle stimulating signals which are normally applied for the treatment of the human body. The circuitry comprises means for providing periodic control signals to regulate the activation and deactivation of blocking oscillator means which generate pulse signals. The blocking oscillator means include feedback means which operate in conjunction with biasing means and the periodic control signals for establishing the predetermined operation of the blocking means to generate the aforementioned pulse signals in a periodic manner. Output means including self-biasing amplifying elements amplify and sharpen the leading edges of the pulse signals before their application to the output terminals. The pulse generating circuitry is specifically designed to draw minimum current from a battery source.

The application of electrical pulses to the muscles of the human body are known to cause such muscles to contract. This application of electrical pulses has been used for different purposes such as the exercise of facial muscles to reduce or eliminate their sagging and generally improve the appearance of the individual.

The application of electrical pulses to such human use produces problems resulting from the need to insure isolation between the applicator electrode and a power source which was usually the normal A.C. house voltage. In response to such problems, the industry devised pulse generating circuitry which operated from battery power and disposed of the need for such A.C. voltage sources. However, the employment of battery power has also introduced additional problems not encountered with previous pulse generating circuitry. Briefly, prior art devices using battery power have been complex, bulky, and inefficient in their use of battery current. The development and use of transistorized circuitry has to some extent alleviated, but not completely solved these problems.

The pulse generating circuit of this invention provides a sophisticated, but relatively uncomplicated, means for generating suitable electrical pulses for exercising the various muscles of the human body, and in particular, the facial muscles. The individual circuits comprising the pulse generator are designed to operate at extremely low levels thereby providing considerably less power drain from the battery source than the prior devices. Such low-powered operation enables the use of smaller circuit components such as transistors, resistors, and capacitors. This, in conjunction with the simplified circuitry enables the assembled unit to be contained in a compact, light-weight, and easily handled package. The low-powered operation also results in increased battery life which way, for example, exceed six months of daily use.

Furthermore, the above advantages have been obtained with a commensurate improvement in the desirable characteristics of the electrical output pulses. Optimum stimulation to cause the muscles of the human body to contract and, in particular, the facial muscles, requires pulses having a relatively high voltage-to-width ratio and a steep waveform. For example, a high voltage, wide-width pulse having a low rising wave front produces an undesirable stinging sensation. A low voltage, wide-width pulse does not induce the proper muscular contraction. The circuitry in accordance with this invention provides pulse output having an adjustable amplitude level to suit the needs of the individual user and having a sharp rising voltage waveform of an optimum width to induce the proper muscle contractions. This result is achieved by the circuitry of the instant invention in the design of the blocking oscillator and the output stage which provide the desired pulses and shaping of the pulse output waveform.

An object of the present invention is to provide a generating circuit for producing muscle stimulating signals which functions at low operating levels from a battery source.

Another object is to provide muscle stimulating signals from a battery operated pulse generating circuit wherein the current drain from the battery is extremely low resulting in longer battery life.

A further object is to provide improved circuitry for generating muscle stimulating signals which can be integrated into a compact package along with the battery and activator contact elements.

And yet another object is to provide improved circuitry for generating muscle stimulating pulsed signals having steep rising waveforms.

The novel features that are considered characteristic of this invention are set forth with particularity in the appended claims. The invention, itself, both as to its organization and method of operation, as well as additional objects and advantages thereof, will best be understood from the following description when read in connection with the accompanying drawing, which is a circuit diagram of an embodiment of the invention.

With reference to the figure, the pulse generating circuit comprises control signal generator 20 which produces bi-polar periodic control signals of a predetermined duration to initiate the generation of pulse signals from blocking oscillator 44. Biasing means 54 serve to establish a fixed, stable operating point for blocking oscillator 44. Output means 60 essentially comprises an amplifying stage to produce pulse signals of sufficient amplitude and of desired pulse shape for stimulating the muscles of the human body and, in particular, the facial muscles thereof. The circuit operates entirely from battery source 18 which need only supply a minimal current because of the unique design and operation of the pulse generating circuitry.

Control signal generator 20 includes free-running oscillator 21 which produces bi-polar oscillatory pulses of a desired width to gate 25. Free-running oscillator or multi-vibrator 21 includes transistors 22 and 24 which are connected in a well-known manner to produce the desired pulse output. Multi-vibrator 21 preferably operates at a frequency of thirty cycles per minute thereby producing positive and negative pulses each having a width of one second. The operating frequency of multi-vibrator 21 is not critical and those skilled in the art will recognize that lower or higher operating frequencies may be used. Gate 25 includes a single transistor 26 which is rendered conductive by a predetermined polarity of the output signals from multi-vibrator 21.

Blocking oscillator 44 comprises transistor 46 and feedback network 49 which interconnects the transistor collector and emitter electrodes. Transistor 46 is biased in a non-conductive state by biasing means 54. Biasing means 54 also establishes a stable, fixed operating point for determining the operation of blocking oscillator means 44. Blocking oscillator means 44 is shocked into oscillation by the conduction of gate 25 which actuates transistor 46 and produces pulse signals only during the conduction of gate 25. The pulse signal output of blocking oscillator 44 is periodic, each period consisting of a bi-polar non-symmetrical pulse followed by an interval during which no pulse is produced. This interval is greater than the pulse width of the bi-polar pulse. Such an asymmetrical pulse output is obtained by the design of feedback network 49 and its coaction with the control signal output from gate 25. The frequency of the periodic, bi-polar pulse is preferably approximately sixty cycles per second and is not critical. As in the case of multi-vibrator 21, lower or higher frequencies may be advantageously used.

Output circuit 60 essentially comprises input transformer 62, output transformer 72, and transistors 64, 68 which amplify the signal provided at secondary winding 62*s* of input transformer 62. An advantageous feature of output circuit 60 is the fact that transistors 64, 68 operate at optimum power levels for the pulses which are amplified. Additionally, output circuit 60 shapes the pulses to have the desired steep rising wavefronts. The operation of this circuit provides a considerable reduction in the current drain from battery 18 while providing an improved pulsed output waveform. Output circuit 60 also includes a combined on/off and volume control switch 74 which may be similar to that found in transistor radios.

In multi-vibrator 21, emitter electrode 22*e*, base electrode 22*b*, and collector electrode 22*c* of transistor 22, as well as emitter 24*e*, base 24*b*, and collector 24*c* of transistor 24, are connected to the other components as follows. Emitters 22*e*, 24*e* are commonly connected to the positive terminal 17 of battery source 18 which is preferably nine volts and of the type normally used in transistor radios. Negative terminal 19 of the battery source is connected to ground, and power supplied to the circuit elements, when switch 74 is closed. Base electrodes 22*b*, 24*b* are respectively connected to ground reference 23 through resistors 28, 30. Collector electrodes 22*c*, 24*c* are connected to ground reference 23 by means of resistors 32, 34, respectively. Capacitors 36, 38, respectively, interconnect collector electrode 22*c* with base electrode 24*b*, and collector electrode 24*c* with base electrode 22*b* in a manner well known to those skilled in the art.

The closing of switch 74 causes multi-vibrator 21 to oscillate at a frequency determined by the selected values of resistor and capacitor cross-coupling elements. The component values shown in the figure produce bi-polar pulses at a frequency of approximately thirty pulses per minute. The operation of such a multi-vibrator circuit is sufficiently well known to those skilled in the art that further explanation of its operation is deemed unnecessary for the purposes of this invention. However, it is important to note that the component elements of multi-vibrator 21 are selected such that the circuit requires extremely low current thereby considerably reducing the current drain from the battery 18. To this end, transistors 22, 24 are preferably RCA type 2N–2613. However, any other suitable transistors having high betas (forward current gain) would be acceptable.

The output is taken from multi-vibrator 21 at collector 24*c* and provided to base 26*b* of gate transistor 26 through connecting resistor 40. Emitter electrode 26*e* is connected through resistor 42 to the positive terminal 17 of battery 18. Collector electrode 26*c* is connected to emitter electrode 46*e* of blocking oscillator transistor 46 and to node 47 of feedback network 49. Transistor 26 is non-conductive during those intervals of the pulse output from multi-vibrator 21 when transistor 24 is conducting. Transistor 26 is rendered conductive during those portions of the pulse interval when transistor 24 is non-conductive.

The conductance of transistor 26 raises the potential at node 47 of feedback network 49 and causes blocking oscillator transistor 46 to conduct since emitter 46*e* is thereby raised to a potential sufficiently more positive than the bias potential established on base electrode 46*b* by resistor-divider network 54 comprising resistor elements 52 and 53. The initial surge of current provided by the conduction of transistor 46 causes capacitor 50 in feedback network 49 to discharge such that the potential at node 47 and emitter electrode 46*e* is lowered sufficiently to turn off transistor 46. Since transistor 26 is still conducting the potential at node 47 and emitter 46*e* is again raised to cause transistor 46 to conduct and the aforementioned cycle is repeated for the duration or period that gating transistor 26 remains conductive by the control signal provided by multi-vibrator 21. Capacitor 50 and resistor 48 are selected such that the time constant of the discharge of capacitor 50 during the time when transistor 46 is rendered non-conductive is preferably approximately 10 milliseconds. Transistor 46 is preferably a PNP type RCA No. 2N–2613. The characteristics of this transistor along with the associated components shown in FIGURE 1 result in an oscillatory pulse of approximately one-half millisecond duration from the output terminals 73*a*, 73*b*. The aforementioned operation of blocking oscillator 44 results in a periodic waveform of repetitive oscillatory pulses, each period comprising an asymmetrical pulse followed by an interval of no signal which occurs during the period that gating transistor 26 is rendered conductive. As mentioned previously, blocking oscillator 44 is inoperative when transistor 26 is non-conductive. Each asymmetrical pulse from blocking oscillator 44, as it appears across primary winding 62*p* of transformer 62, has a larger positive portion than a negative portion and the wavefront of the positive portion is steeper than is the wavefront of the negative portion. This is, of course, attributable to the operation of blocking oscillator 44; the positive portion of the waveform being produced when transistor 46 is initially shocked into oscillation. Capacitor 56 is merely provided across resistor 53 in bias network 54 to shunt A.C. signals to ground and insure that the bias level at base electrodes 46*b* is made independent of any transistory signals.

The pulsed signal output from blocking oscillator 44 is provided to output circuit 60 by means of voltage step-down transformer 62. Transformer 62 has an impedance ratio of five hundred ohms to three point two ohms (500:3.2) and a corresponding turns ratio of one thousand to eight (1,000:8). One end of secondary winding 62*s* is connected to positive terminal 17 of battery 18 and the other end connected to base electrode 64*b* of power transistor 64. In the embodiment shown in the figure, secondary winding 62*s* is connected to produce a phase reversal of the signal appearing at primary winding 62*p*. Emitter electrode 64*e* is connected to terminal 17 of battery 18 and collector electrode 64*c* is connected to base electrode 68*b* of amplifying transistor 68. Transistor 68 is an NPN and preferably RCA No. 2N–3053 or similar thereto. Base electrode 68*b* is returned to ground through resistor 66. Collector electrode 68*c* is connected to one end of primary winding 72*p* of voltage step-up transformer 72. Transformer 72 is identical to transformer 62, but is connected to provide a voltage step-up from primary to secondary. The other end of primary winding 72*p* is returned to positive terminal 17 of battery 18. The muscle stimulating voltage signals are obtained across output terminals 73*a*, 73*b* which are connected across secondary winding 72*s* of transformer 72. Combined on/off switch and rheostat 74 is interconnected between one side of secondary winding 72*s* and output terminal 73*b*. Resistor 75 is provided across output terminals 73*a*, 73*b* as a load resistor and as a safety measure when the resistance of rheostat 74 is shorted.

In operation, transistor 64 is non-conductive except during those intervals when it is rendered conductive by the large negative pulses appearing across secondary winding 62*s*. The conduction of transistor 64 results in a clipped positive waveform at collector 64*c* which appears at base 68*b*. Transistor 68 amplifies this signal which is fed to primary winding 72*p*.

An advantageous feature of output means 60 is that transistors 64 and 68 only draw current from battery 18 during the negative swings of the signal that appear across secondary winding 62*s*. As can be appreciated from the above described operation of blocking oscillator 44 this represents a very small duty cycle. The pulse generating circuitry, including the output means, draws approximately three milliamps (3 ma.) from battery 18 during the intervals when peak output pulses of approximately sixty volts (peak-to-peak) are generated at output terminals 73*a*, 73*b*. During the off duty cycle, the pulse generating circuitry draws approximately one-quarter milliamp (¼ ma.).

Furthermore, the leading edge of the waveform is sharpened by the derivative action of the transformer inductances since the voltage across an inductance is given by the formula, $$e=L\frac{di}{dt}.$$

Thus, the pulse signals appearing at output terminal 73*a*, 73*b* have steep wavefronts which results in an improved stimulation of the muscle as described, supra. The pulsed output signals have a pulse width of approximately one-half millisecond. For the circuit as described above, the output signal is periodic; the pulse appearing at approximately sixty c.p.s. for a one second interval with a repetition rate of about one second. Each pulse is followed by a ten millisecond interval during which no signal appears at output terminals 73*a*, 73*b*. Output terminals 73*a*, 73*b* may be made from any conductive material; however, brass electrodes are preferred.

Rheostat 74 provides a convenient means for varying the output voltage from sixty volts (peak-to-peak) to a lower voltage. This is desirable to account for the individual differences in the sensitivity of facial muscles, particularly between men and women.

Those skilled in the art will recognize that various modifications of the disclosed preferred embodiment can be made without departing from the spirit of the invention. For example, NPN transistors may be substituted for PNP transistors and PNP for NPN transistors. However, the scope of the invention is intended to be limited only by the appended claims.

Having thus described the invention, what is claimed as new and desired to be secured by Letters Patent is:

1. A generating circuit for providing muscle stimulating signals comprising:

control means for providing control signals, pulse generator means for generating periodic pulse signals, biasing means for conditioning the pulse generator means in an inoperative state, the pulse generator means including feed-back means responsive to the control signals to condition the pulse generator means in an operative state, the operative state of the pulse generator means initiating a signal from the feedback means to return the pulse generator means to the inoperative state, the conditioning of the pulse generator means in an operative state occurring repetitively during a predetermined state of the control signals, output means for amplifying and shaping the pulse signals to produce output pulse signals having a steep leading edge.

2. A generating circuit according to claim 1 wherein the output means includes at least one amplifying means normally in a non-operative state, the amplifying means being rendered operational only by the pulse signals.

3. A generating circuit according to claim 2 wherein the output means further includes at least one inductive element for differentiating the pulse signals.

4. A generating circuit according to claim 3 wherein the output means further includes output terminals and combined on/off switch and amplitude control means, the combined on/off switch and amplitude control means interconnecting the output terminal and the at least one inductive element.

5. A generating circuit according to claim 4 further comprising transformer means including primary and secondary windings and wherein the secondary winding includes the at least one inductive element, first amplifying means connected to the secondary winding, and the output means further includes second amplifying means normally in a non-operative state and connected to the output of the first amplifying means to be rendered operational only by the operation of the first amplifying means, and additional transformer means, including a primary winding connected to the output of the second amplifying means and a secondary winding connected to the combined on/off switch and amplitude control means.

6. A generating circuit according to claim 5 wherein the first and second amplifying means are transistors.

7. A generator circuit according to claim 1 wherein the pulse generator means are blocking oscillator means, the blocking oscillator means including input and output means, the feedback means including first and second nodes, and the input means are connected to the first node and the blocking oscillator output means are connected to the second node.

8. A generator circuit according to claim 7 wherein the control means includes gating means having output means, the gate means being alternately rendered operative and inoperative by the control signals, the gate output means are connected to the blocking oscillator input means and to the first node, and the blocking oscillator conductive means are rendered operative only during the conduction of the gating means.

9. A generator circuit according to claim 8 wherein the feedback means consists of a resistance in parallel with a capacitance.

10. A generator circuit according to claim 9 wherein the blocking oscillator conductive means consists of a transistor having base, emitter and collector electrodes, the emitter electrode forming the blocking oscillator input means, the base electrode being connected to the biasing means, the blocking oscillator further including an inductor having two end terminals and a tapped terminal intermediate the two end terminals, the collector electrode being connected to one end terminal, the other end terminal being connected to a ground reference, and the tapped terminal being connected to the second node.

No references cited.

ARTHUR GAUSS, *Primary Examiner.*

J. D. FREW, *Assistant Examiner.*